United States Patent
Li

(10) Patent No.: US 10,454,807 B2
(45) Date of Patent: Oct. 22, 2019

(54) CONNECTION MINIMIZATION FOR DISTRIBUTED SYSTEM

(71) Applicant: Futurewei Technologies, Inc., Plano, TX (US)

(72) Inventor: Li Li, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 314 days.

(21) Appl. No.: 15/293,207

(22) Filed: Oct. 13, 2016

(65) Prior Publication Data

US 2018/0109435 A1    Apr. 19, 2018

(51) Int. Cl.
| | |
|---|---|
| *H04L 12/751* | (2013.01) |
| *H04L 12/911* | (2013.01) |
| *H04L 29/08* | (2006.01) |
| *H04L 12/753* | (2013.01) |

(52) U.S. Cl.
CPC .............. *H04L 45/02* (2013.01); *H04L 45/48* (2013.01); *H04L 47/70* (2013.01); *H04L 67/2842* (2013.01)

(58) Field of Classification Search
CPC ......... H04L 45/02; H04L 67/02; H04L 45/12; H04L 67/00; H04L 67/2842; H04L 61/6009; H04L 41/12; H04L 41/5041; H04L 41/5096; H04L 45/48; H04L 47/70; G06F 3/0635; G06F 17/3089; G06F 17/30896; G06F 17/30958; G06F 11/2235; G06F 16/9024; G06F 11/3476; G06F 16/904; H04W 40/00; H04W 40/02; H04N 21/23106; H04N 21/8586
See application file for complete search history.

(56) References Cited

U.S. PATENT DOCUMENTS

| | | | | |
|---|---|---|---|---|
| 9,741,005 | B1* | 8/2017 | Adogla | ............... G06Q 10/0635 |
| 2005/0265317 | A1* | 12/2005 | Reeves | ............. H04L 29/12066 370/235 |
| 2006/0112089 | A1* | 5/2006 | Broder | ................ G06F 17/3089 |

(Continued)

OTHER PUBLICATIONS

"Flask framework 0.10.0", [online]. [archived on Apr. 1, 20141]. Retrieved from the Internet: <URL: http://web.archive.org/web/20140401050229/http://flask.pocoo.org>, (2014), 2 pgs.

(Continued)

*Primary Examiner* — Hitesh Patel

(74) *Attorney, Agent, or Firm* — Schwegman Lundberg & Woessner, P.A.

(57) ABSTRACT

A method computer implemented method of minimizing connections in a distributed system includes traversing paths in a directed graph representation of the distributed system having a fixed set of paths between nodes representing resources of the distributed system and edges representing connections between the resources by performing a random walk procedure to provide a reduced number of paths in the directed graph representation, and identifying excessive connections between the resources by simulating a client accessing the resources and identifying as excessive, connections that are not used by any of the reduced number of paths, wherein the excessive connections are removable from the distributed system without preventing client access to resources in the distributed system.

12 Claims, 10 Drawing Sheets

(56) References Cited

U.S. PATENT DOCUMENTS

| | | | |
|---|---|---|---|
| 2006/0168251 A1* | 7/2006 | Buchheit | H04L 67/02 709/228 |
| 2008/0275833 A1* | 11/2008 | Zhou | G06N 7/005 706/45 |
| 2009/0164621 A1* | 6/2009 | Kothari | H04L 43/00 709/224 |
| 2010/0114914 A1* | 5/2010 | Gerges | H04L 67/02 707/751 |
| 2010/0175025 A1* | 7/2010 | Lin | G06F 9/451 715/811 |
| 2011/0289063 A1* | 11/2011 | Radlinski | G06F 17/30864 707/706 |
| 2015/0096041 A1* | 4/2015 | Bommireddipalli | H04L 63/1416 726/26 |
| 2015/0378994 A1* | 12/2015 | Kaplinger | G06F 17/3092 707/722 |
| 2016/0098337 A1* | 4/2016 | Ekambaram | G06F 11/3409 719/318 |
| 2016/0381136 A1 | 12/2016 | Li et al. | |
| 2017/0046254 A1* | 2/2017 | Buege | G06F 11/3692 |

OTHER PUBLICATIONS

"JSR-000339, The JavaTM API for RESTful Web Services, Version 2.9", [online]. Retrieved from the Internet: <URL: https://jcp.org/aboutJava/communityprocess/final/jsr339/index.html>, (May 22, 2013), 2 pgs.

"RAML Version 1.0: RESTful API Modeling Language", [online]. Retrieved from the Internet: <URL: https://github.com/raml-org/raml-spec/blob/master/versions/raml-10/raml-10.md>, (2016), 68 pgs.

"Restlet Framework 2.3", [online]. [archived on Jan. 21, 2016]. Retrieved from the Internet: <URL: https://web.archive.org/web/20160121191747/https://restlet.com/technical-resources/restlet-framework/guide/2.3>, (2016), 4 pgs.

"Swagger 2.0", [online]. Retrieved from the Internet: <URL: https://github.com/OAI/OpenAPI-Specification/blob/master/versions/2.0.md>, (2016), 41 pgs.

Alarcon, Rosa, "Linking Data from RESTful Services", LDOW 2010, Apr. 27, 2010, Raleigh, NC, (2010), 10 pgs.

Champin, Pierre-Antoine, "RDF-REST: A Unifying Framework for Web APIs and Linked Data", SALAD 2013 Workshop—Services and Applications over Linked APIs and Data, (May 2013), 10-19.

Fielding, Roy T., "Architectural Styles and the Design of Network-based Software Architectures", Ph.D. Dissertation, University of California, Irvine, [online]. Retrieved from the Internet: <URL: https://www.ics.uci.edu/~fielding/pubs/dissertation/fielding_dissertation.pdf>, (2000), 180 pgs.

Fielding, Roy T., "REST API's must be hypertext-driven", [online]. Retrieved from the Internet: <URL: http://roy.gbiv.com/untangled/2008/rest-apis-must-be-hypertext-driven>, (Oct. 20, 2008), 16 pgs.

Gomadam, Karthik, et al., "SA-REST, Semantic notation of Web Resources", W3C Member Submission, [online]. Retrieved from the Internet: <URL: http://www.w3.org/Submission/SA-REST/>, (Apr. 5, 2010), 11 pgs.

Hadley, Marc, "Web Application Description Language", W3C Member Submission, 31, [online]. Retrieved from the Internet: <URL: http://www.w3.org/Submission/2009/SUBM-wadl-20090831/>, (Aug. 2009), 21 pgs.

Haupt, Florian, et al., "A Conversation Based Approach for Modeling REST APIs", 2015 12th Working IEEE/IFIP Conference on Software Architecture (WICSA), (2015), 165-174.

Hopcroft, et al., "Introduction to Automaton Theory", Languages, and Computation 2nd Edition, (Nov. 24, 2000), 537 pgs.

Hopcroft, John E., et al., "Introduction to Automata Theory, Languages, and Computation", 2nd Edition, Addison-Wesley, Reading, MA, (2001), 537 pages.

Laitkorpi, Markku, et al., "Towards a Model-Driven Process for Designing ReSTful Web Services,", 2009 IEEE International Conference on Web Services, (2009), 173-180.

Li, Li, et al., "A REST Service Framework for Fine-Grained Resource Management in Container-Based Cloud", 2015 IEEE 8th International Conference on Cloud Computing, (2015), 645-652.

Li, Li, et al., "Compatibility Checking of REST API Based on Coloured Petri Net", Web Information Systems and Technologies (WEBIST), Lecture Notes in Business Information Processing 246, (Mar. 2016), 25-43.

Li, Li, et al., "Design and Describe REST API without Violating REST: a Petri Net Based Approach", 2011 IEEE International Conference on Web Services (ICWS 2011), (2011), 508-515.

Li, Li, et al., "Design Patterns and Extensibility of REST API for Networking Applications", IEEE Transaction on Network and Service Management, 13(1), (2016), 154-167.

Richardson, Leonard, et al., "RESTFUL Web Services", O'Reilly Media, Inc., Sebastopol, CA, (2007), 448 pgs.

Robie, Jonathan, "RESTful API Description Language (RADL)", [online]. Retrieved from the Internet: <URL: https://github.com/restful-api-description-language/RADL>, (2014), 3 pgs.

Robie, Jonathan, et al., "RESTful Service Description Language (RSDL), Describing RESTful Services Without Tight Coupling", Balisage: The Markup Conference, [online]. Retrieved from the Internet: <URL: https://www.balisage.net/Proceedings/vol10/print/Robie01/BalisageVol10-Robie01.html>, (2013), 27 pgs.

Schreier, Silvia, "Modeling RESTful applications", WS-REST 2011, (2011), 15-21.

Weiss, George H., et al., "Random Walks: Theory and Selected Applications", In: Advances in Chemical Physics, vol. 52, edited by Prigogine, I., et. al., John Wiley & Sons, (1983), 363-505.

\* cited by examiner

| PATH | USED HYPERLINKS | CACHED HYPERLINKS |
|---|---|---|
| A, B, C, D | A-B, A-C, C-D | A-C |
| A, B, D | A-B, B-D | NONE |
| A, C, B, D | A-C, A-B, B-D | A-B |
| A, C, D | A-C, C-D | NONE |

CONNECTION MINIMIZATION FOR DISTRIBUTED SYSTEM

FIELD OF THE INVENTION

The present disclosure is related to connections in a distributed system, and in particular to minimizing connections in a distributed system.

BACKGROUND

In a distributed system, resources forming the distributed system should be reachable by some paths from an entry point. Hyperlinks are one mechanism used to reach resources in the distributed system. To make all the resources reachable without prudence can result in excessive links, such as hyperlinks, that do not provide new services but increase the dependence between the resources. Excessive hyperlinks are difficult to identify because the resources can have dynamic and unbounded paths, and the hyperlinks used to navigate a path are not observable and can be ambiguous.

SUMMARY

A method computer implemented method of minimizing connections in a distributed system includes traversing paths in a directed graph representation of the distributed system having a fixed set of paths between nodes representing resources of the distributed system and edges representing connections between the resources by performing a random walk procedure to provide a reduced number of paths in the directed graph representation, and identifying excessive connections between the resources by simulating a client accessing the resources and identifying as excessive, connections that are not used by any of the reduced number of paths, wherein the excessive connections are removable from the distributed system without preventing client access to resources in the distributed system.

Various examples are now described to introduce a selection of concepts in a simplified form that are further described below in the detailed description. The summary is not intended to identify key or essential features of the claimed subject matter, nor is the summary intended to be used to limit the scope of the claimed subject matter.

In example 1, a method computer implemented method of minimizing connections in a distributed system includes traversing paths in a directed graph representation of the distributed system having a fixed set of paths between nodes representing resources of the distributed system and edges representing connections between the resources by performing a random walk procedure to provide a reduced number of paths in the directed graph representation, and identifying excessive connections between the resources by simulating a client accessing the resources and identifying as excessive, connections that are not used by any of the reduced number of paths, wherein the excessive connections are removable from the distributed system without preventing client access to resources in the distributed system.

Example 2 includes, the method of example 1 wherein identifying excessive connections comprises applying a cache-first policy to take client cached connections into account followed by application of a recent-first policy.

Example 3 includes, the method of example 2 wherein the cache-first policy selects cached connections over direct connections.

Example 4 includes, the method of any of examples 2-3 wherein the recent-first policy selects a connection most recently used.

Example 5 includes, the method of any of examples 2-4 wherein the cache-first policy and recent-first policy resolve ambiguous connections.

Example 6 includes, the method of any of examples 1-5 wherein the random walk procedure includes starting from an entry node of the directed graph, selecting a next edge at random, moving to a node coupled by the selected edge and repeating random selection of an edge until a predefined path length is reached or no next edge exists, and repeating selecting a next edge from the entry node, moving, and repeating selection of an edge until the reduced number of paths is obtained.

Example 7 includes, the method of example 6 wherein a different random seed is used at the entry node for each path.

Example 8 includes, the method of any of examples 1-7 and further includes traversing all paths in the directed graph representation of the distributed system via a distinct walk procedure to enumerate all distinct paths, and using all the distinct paths to identify excessive connections by simulating the client accessing the resources and identifying as excessive, connections that are not used by any of the distinct paths.

Example 9 includes, the method of any of examples 1-8 wherein edges comprise hyperlinks between resources.

Example 10 includes, the method of example 9 wherein the nodes comprise a uniform resource indicator (URI) used by the hyperlinks to form the connections.

Example 11 includes, the method of any of examples 9-10 wherein the hyperlinks include operations comprising get, put, post, and delete.

Example 12 includes, the method of any of examples 1-11 wherein the directed graph comprises a resource oriented network (RON) representation of the distributed system comprising a REST API (Representational State Transfer Application Program Interface).

In example 13, a device includes a non-transitory memory storage comprising instructions and one or more processors in communication with the memory. The one or more processors execute instructions to traverse paths in a directed graph representation of the distributed system have a fixed set of paths between nodes representing resources of the distributed system and edges representing connections between the resources by performing a random walk procedure to provide a reduced number of paths in the directed graph representation and identify excessive connections between the resources by simulating a client accessing the resources and identifying as excessive, connections that are not used by any of the reduced number of paths, wherein the excessive connections are removable from the distributed system without preventing client access to resources in the distributed system.

Example 14 includes, the device of example 13 wherein identifying excessive connections comprises applying a cache-first policy to take client cached connections into account followed by application of a recent-first policy, wherein the cache-first policy selects cached connections over direct connections and wherein the recent-first policy selects a connection most recently used to resolve ambiguous connections.

Example 15 includes, the device of any of examples 13-14 wherein the random walk procedure includes starting from an entry node of the directed graph, selecting a next edge at random, moving to a node coupled by the selected edge and repeating random selection of an edge until a predefined path length is reached or no next edge exists, and repeating selecting a next edge from the entry node, moving, and repeating selection of an edge until the reduced number of paths is obtained.

Example 16 includes, the device of example 15 wherein a different random seed is used at the entry node for each path.

Example 17 includes, the device of any of examples 13-16 wherein the instructions are further executed to traverse all paths in the directed graph representation of the distributed system via a distinct walk procedure to enumerate all distinct paths and use all the distinct paths to identify excessive connections by simulating the client accessing the resources and identifying as excessive, connections that are not used by any of the distinct paths.

Example 18 includes, the device of any of examples 13-17 wherein edges comprise hyperlinks between resources, wherein the nodes comprise a uniform resource indicator (URI) used by the hyperlinks to form the connections, wherein the hyperlinks include operations comprising get, put, post, and delete and wherein the directed graph comprises a resource oriented network (RON) representation of the distributed system comprising a REST API (Representational State Transfer Application Program Interface).

In example 19, a system includes a resource oriented network (RON) directed graph representation of the distributed system includes a REST API (Representational State Transfer Application Program Interface) stored on a non-transitory storage device wherein nodes of the graph represent resources identified by uniform resource indicators (URIs) and edges represent hyperlinks. A random walk procedure is stored on the storage device having code executable by one or more processors to perform a procedure including starting from an entry node of the directed graph, selecting a next edge at random, moving to a node coupled by the selected edge and repeating random selection of an edge until a predefined path length is reached or no next edge exists, and repeating selecting a next edge from the entry node, moving, and repeating selection of an edge until a selected number of paths is obtained. A client model is stored on the storage device and includes a cache-first and a recent-first policy to resolve ambiguous hypertext driven paths. A minimization procedure is stored on the storage device to identify excessive hyperlinks from the selected number of paths, such excessive number of hyperlinks not being used by any of the selected number of paths.

Example 20 includes, the system of example 19 wherein the cache-first policy selects cached connections over direct connections and wherein the recent-first policy selects a connection most recently used to resolve ambiguous connections.

DETAILED DESCRIPTION

Figures 1, 2:
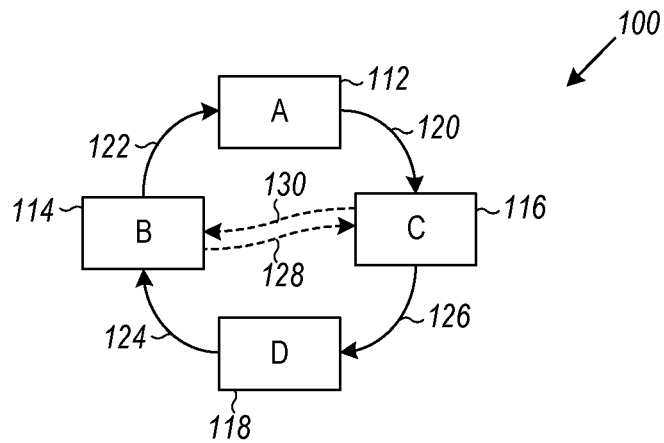
FIG. 1 is a block diagram illustrating an example hypothetical distributed system with resources and connections according to an example embodiment.
FIG. 2 is a table illustrating multiple navigated paths, the hyperlinks used for the paths, and the cached hyperlinks used according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A distributed network is a network where resources may be connected to provide service for the clients through message exchanges. One such distributed network may be referred to as a resource-oriented network (RON) and may be modeled by a directed graph. A path between the resources of the network may include an operation and link, such as a hyperlink. Various resources that may be connected in a distributed network drive the clients through the paths using hypertext messages that consist of hyperlinks.

REST (Representational State Transfer) is a hybrid client-server architectural style inspired by the Web. REST API (application program interface) may include distributed resources, and has become a popular API choice for distributed systems, including cloud computing, software-defined networking and Internet-of-Things. A REST API consists of a set of resources that are identified by a uniform resource identifier (URI) and connected by hyperlinks. The REST clients access and manipulate the states of these resources using hypertext representations through a well-defined uniform interface. A REST client should not know the resource connections of a REST API, except an entry point. Starting from this entry point, a client can discover all the necessary resources following the hyperlinks provided by the REST API and exchange hypertext over a variety of network protocols with the resources. This hypertext-driven interaction is also called "Hypertext as the Engine of Application State," a design constraint in REST that allows a REST API to evolve its resource identifications, representations, interactions and connections relatively independently.

A designer of a REST API can inadvertently create excessive connections while attempting to allow the client to discover all the resources, as hyperlinks are easy to insert. Excessive hyperlinks do not add new services to a REST API, but provide additional ways to discover the same services. However, excessive hyperlinks increase the dependence between the resources, making a REST API difficult to evolve. Whenever a resource changes its identification, all the hyperlinks to that resource must change accordingly. Resource dependences increase the local states of the resources, which in turn increase the failure conditions. In the worst case, a resource with N connections can have $2^N$ local states, as each of the connected resources may be present or absent. As a REST API can change frequently, such dependences can become an acute problem to manage and update.

A REST API design can inadvertently include excessive hyperlinks if the design fails to consider the fact that a hypertext-driven client, unlike a human user, can efficiently cache and reuse discovered hyperlinks. Although client cache is one of the design patterns of REST, and most client devices have sufficient memory and storage to cache hyperlinks, this design pattern is not easy to apply because it involves not only how the resources are connected but also how the clients navigate the connections.

FIG. 1 is a block diagram illustrating an example hypothetical system, such as a REST API 100 with four resources A at 112, B at 114, C at 116, and D at 118 where A at 112 is the entry point. The resources are connected by six connections, such as hyperlinks that include a URI or other resource identification mechanism and a description of the URI. The description of the URI may be in the form of a mark-up language representation such as HTML (hypertext markup language) or XML (extended mark up language), or other type of language in further embodiments.

The connections are shown as arrows 120, 122, 124, 126, 128, and 130. Arrows 120, 122, 124, and 126 are solid arrows and represent a minimum set of connections to ensure each resource is reachable from A at 112, an entry point. The links in such a set of links are referred to as essential.

Two of the connections 128 and 130 are represented by broken line arrows and are excessive. Note that REST API 100 is a simplified hypothetical distributed system, and that other systems may have many more resources and many more connections, making identification of excessive connections that can be removed, quite a significant task. In one embodiment, excessive hyperlinks are identified in an efficient manner Hyperlinks B→C and C→B are excessive, because a client with cache can navigate any path of this REST API without them. For example, to navigate path [A, B, C, D], the client can reuse hyperlink A→C cached at A to reach C from B without using hyperlink B→C at all. On the contrary, if any of the essential hyperlinks are removed, then the resource pointed to by the hyperlink becomes unreachable from A.

FIG. 2 is a table 200 illustrating multiple navigated paths, the hyperlinks used for the paths, and the cached hyperlinks used. In one embodiment, the cached hyperlinks are A→C and A→B, and in the case of paths [A, B, D] and [A, C, D], no hyperlinks are cached. In general, a hyperlink is excessive if and only if no client would use it to navigate any path of a REST API. A client does not need all hyperlinks due to the ability of clients to cache hyperlinks and reuse them.

Figure 3:
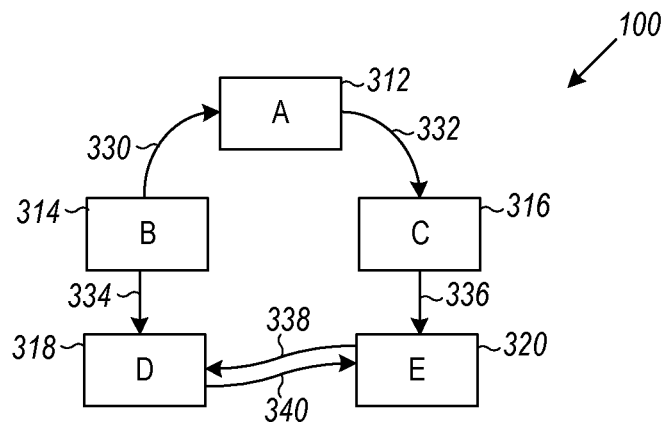
FIG. 3 is a block diagram illustrating a further example hypothetical distributed system with resources and connections according to an example embodiment.

FIG. 3 is a block diagram illustrating a further example hypothetical system, such as a REST API 300 with five resources A at 312, B at 314, Cat 316, Dat 318, and Eat 320, where A at 312 is the entry point. The resources are connected by six connections, such as hyperlinks that include a URI or other resource identification mechanism and a description of the URI.

The connections are shown as arrows 330, 332, 334, 336, 338, and 340. The arrows are solid arrows and represent a minimum set of connections to ensure each resource is reachable from A at 312, the entry point.

Note that in some cases the removal of one essential connection, will break the ability of each resource to connect to any of the other resources. In other cases, the removal of one essential connection will increase connection discovery overhead. For example, if the connection, hyperlink D→E 338, is removed, a client cannot reach both D and E with 8 messages, as the client has to take another path [A, C, E] after D with 10 messages in total. The discovery overhead becomes significant when the target resources are farther away from the entry point.

The Example REST APIs 100 and 300 show that essential hyperlinks are not confined to a minimum spanning tree as they can form a directed graph. Although all the minimum set of links, with excessive links removed in FIG. 1 happen to be on the shortest paths from the entry point A to some resources, this is not true in FIG. 3, where [A, B, D, E] is not a shortest path, but all its hyperlinks are used to ensure all resources can connect. For these reasons, excessive link identification algorithms that only consider the connections of a REST API cannot accurately identify excessive hyperlinks. Embodiments that determine excessive hyperlinks based on how the clients navigate a REST API are now described.

In one embodiment, a hyperlink is defined to be excessive, if and only if the hyperlink is not used by any hypertext-driven client with cache to navigate any path of a REST API. This definition prevents false positive and false negative decisions, such that all the essential hyperlinks are preserved and all the excessive hyperlinks are removed.

Figure 4:
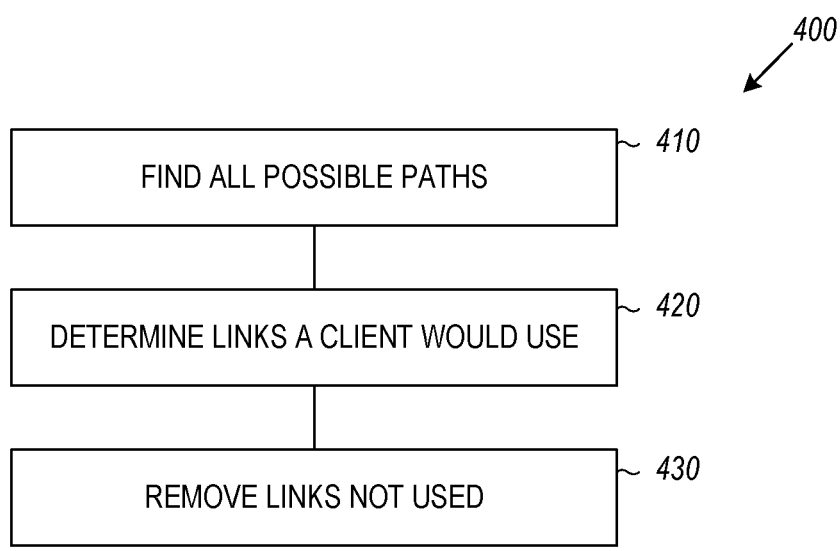
FIG. 4 is a flowchart illustrating a method of identifying excessive hyperlinks according to an example embodiment.

FIG. 4 is a flowchart illustrating a method 400 of identifying excessive hyperlinks. To identify excessive hyperlinks, all possible paths of a REST API are found and collected at 410. Then it is determined at 420 which hyperlinks a client with cache would use to navigate each path. Hyperlinks not used for any path are excessive at 430, and may be removed. Method 400 addresses at least two challenges. In a first challenge, a REST API can have dynamic and unbounded number of paths when it dynamically creates and deletes resources in response to the clients. The second challenge results from the hyperlinks used to navigate a path not being observable by the REST API and they can be ambiguous such that different sets of hyperlinks can be used to navigate the same path to reach a desired resource.

To address the first challenge, a RON (Resource-Oriented Network) is used to avoid dynamic and unbounded paths of a REST API, because each RON has a fixed topology that does not change with the resource instances of the REST API. Dynamic paths are reduced to a fixed set, which can still be fairly large. An efficient random walk algorithm is utilized in one embodiment to reduce the large number of fixed paths of a RON to a small set.

To address the second challenge, a hypertext-driven REST client model using a path tree to represent the hyperlinks for any path of the RON is defined with two policies to cope with ambiguous paths. This client model leads to an efficient connection minimization algorithm that can identify excessive hyperlinks not used by a collection of paths.

Method 400 combines the random walk and connection minimization algorithms to identify excessive hyperlinks in a REST API in polynomial time without involving the actual clients. The method has been implemented and tested on several REST APIs. The tests show the method is correct and converges 90.6% to 99.9% faster than prior methods.

Current approaches to REST API development fall into three categories: 1) programming platforms such as such as Restlet for Java and Flask for Python; 2) model-driven toolkits such as WADL, RAML, Swagger, RSDL, API-Blueprint, SA-REST, ReLL, REST Chart, RADL, and RDF-REST; and 3) hybrid of the first two, such as JAX-RS. Connections between the resources of a REST API are determined manually, and changes to the connection are also done manually by modifying the code, specification, or annotation respectively for the different current approaches.

In one embodiment, RON, which is a directed graph that represents the resources of a REST API as nodes and their connections as edges is adapted to minimize the connections of a REST API. RON can accept linear and nonlinear paths. If using JAVA to design a REST API, a toolkit may be used to scan the JAVA code and generate a RON. Other methods may commonly be used to derive RONs, such as by creating a graph used to generate code and use of graphical user interface to drag elements and draw a RON graph. Still further, tools may be used to extract metadata from code and generate a RON.

In one embodiment, the nodes of a RON may be resource types. If the REST API is implemented in some object-oriented programming language, then the nodes of a RON graph may represent the classes and the edges represent the class references. These class references will be inherited by the objects of the classes. Removal of excessive hyperlinks in a RON prevents excessive class references from being propagated to the objects. More formally, RON may be defined as follows:

RON (Resource-Oriented Network)

A RON graph G is a 4-tuple G=(N, E, O, s), where:
N={n|n is a URI} is a set of nodes;
E={(m,o,n)}|(m,n)⊆N×N and o∈O} is a set of edges;
O={Get, Put, Post, Delete} is a set of operations;
s∈N is an entry node from which all nodes in N are reachable.

Figure 5:
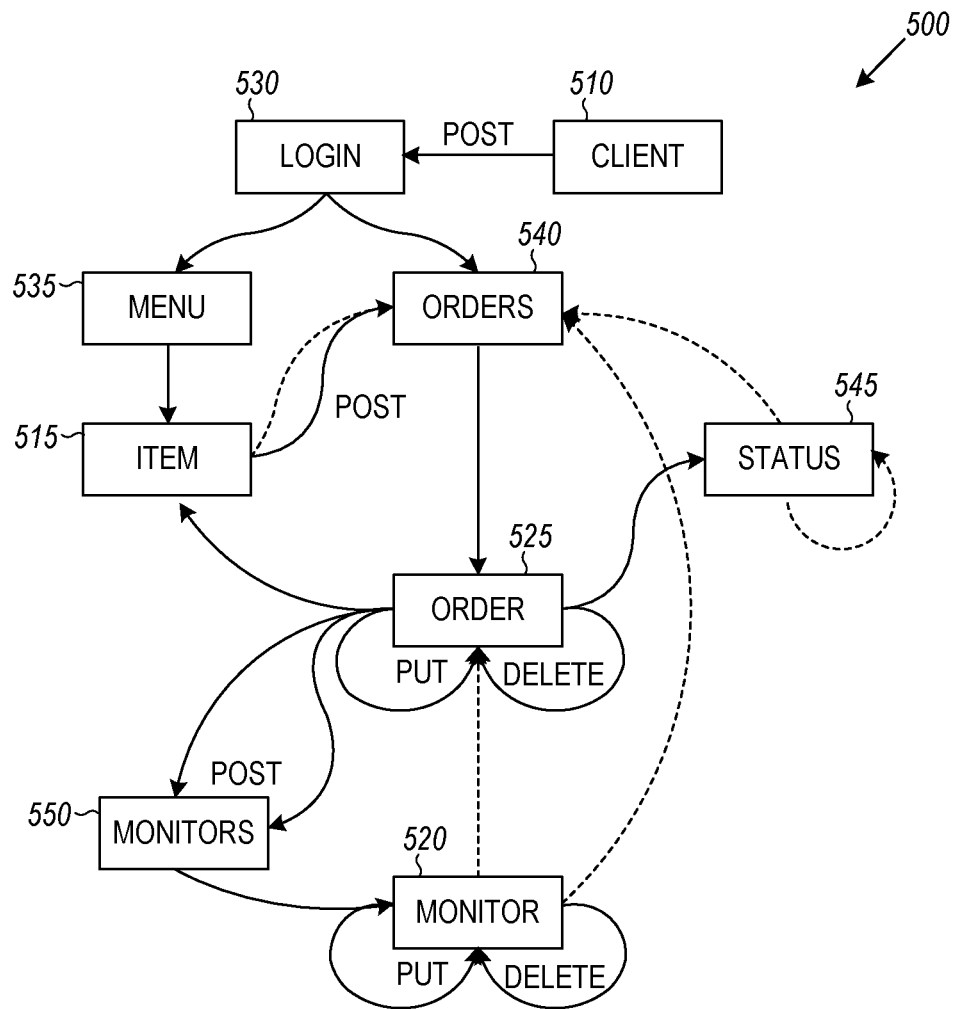
FIG. 5 is an illustration of a RON graph that represents a REST API for clients to order food items and monitor the progress of orders while an order can be updated and canceled according to an example embodiment.

FIG. 5 is an illustration of a RON graph 500 that represents a REST API for clients 510 to order food items 515 and monitor 520 the progress of orders 525 while an order can be updated and canceled. For simplicity of representation in visual form, each node is labeled by a word instead of URI. Each edge is labeled by one of the 4 HTTP operations: Get, Post, Put and Delete (for clarity, all Get operations are omitted). Node login at 530 is the entry node of the RON. As in FIG. 1, edges drawing as broken lines or dashes are excessive and solid lines are essential. Additional nodes include a menu node 535 from which items 515 may be selected by the client 510 and posted to an intermediate orders node 540. A status node 545 may be used to show a status of orders, which can be displayed via an intermediate monitors node 550.

Interactions of a client with a REST API can be represented by an observable path in the RON that models the REST API. An observable path can be derived from the log file of a REST API that records client IP addresses, HTTP operations, and the target URIs. An observable path does not indicate the hyperlinks selected by the client for the path, because a URI can come from different hyperlinks contained in different hypertext.

Hypertext-driven paths are a subset of observable paths that are useful to identify excessive hyperlinks. This subset of paths is taken by the clients who navigate the REST API for the first time without using any hyperlinks discovered in the previous sessions. Without the first-time constraint, a client can visit any previously discovered node in any order and almost all the hyperlinks in a RON become "excessive" to the client.

Figure 6:
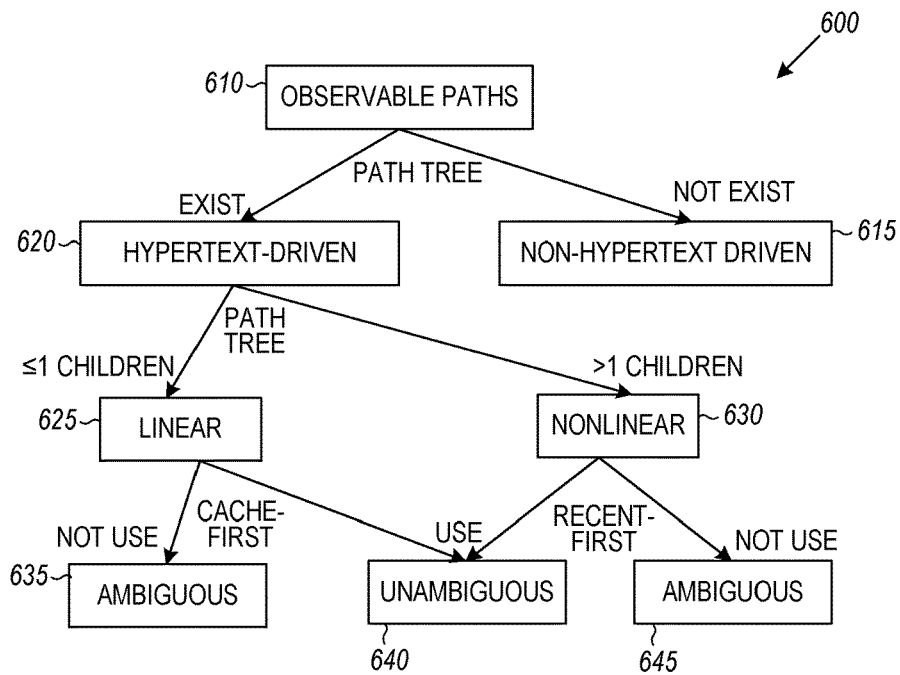
FIG. 6 is an illustration of a decision tree to derive hyperlinks used for hypertext driven paths according to an example embodiment.

To locate hypertext-driven paths in a collection of observable paths, a mechanism called Path Tree may be used. To cope with ambiguous paths, two policies, Cache-First and Recent-First, are applied to different types of hypertext-driven paths. These mechanisms are organized into a decision tree as shown in FIG. 6 at 600 to derive the hyperlinks used for hypertext-driven paths. In path tree 600, observable paths 610 form a top of the tree. Non hypertext driven paths as shown at 615 do not exist, as the tree is limited to hypertext driven paths 620 in one embodiment. As previously indicated, other connection mechanisms that provides similar navigation attributes may be used in further embodiments. If one or few children are in the tree as indicated at 625, the tree may be identified as linear. If more than one child is included as indicated at 630, the tree is non-linear, as divergent paths may result, which is shown later. Note that a path from the linear child 625 may be ambiguous 635, which is not used, or unambiguous 640, which is used. Similarly a path from nonlinear children 630 may be unambiguous 640 and used, or ambiguous 645, and not used. A path is ambiguous, if and only if it has more than one path tree in a RON.

An observable path of a RON may be represented as a sequence of $(o, n)_i$ pairs starting from the entry node of a RON, where o denotes an operation, n denotes a node (i.e. URI), and subscript $i \geq 0$ indicates the position of the pair in the path.

Several paths that may be taken by a client 510 to order a pizza according to the RON graph 500 are now described. A first Path 1 is a hypertext-driven linear path taken by a client to order pizza: Path 1: [(Post, login)$_0$, (Get, menu)$_1$, (Get, item)$_2$, (Post, orders)$_3$, (Get, order)$_4$].

Path 1 is linear, because each pair is connected by a hyperlink to the next pair, i.e. the hyperlink for pair i is always selected from the node in pair i−1. Path 2 below is a hypertext-driven nonlinear path taken by a client to check existing orders before make a new one.

Path 2: [(Post, login)$_0$, (Get, menu)$_1$, (Get, orders)$_2$, (Get, item)$_3$, (Post, orders)$_4$, (Get, order)$_5$]. Path 2 is nonlinear, because there is no hyperlink from node menu to node orders to connect pair 1 (Get, menu)$_1$ with pair 2 (Get, orders)$_2$. When the client 510 visits node login 530 at pair 0, it caches hyperlink login→orders and selects it at pair 2. In other words, the hyperlink for pair 2 is selected from the node in pair 0. In general, the hyperlinks selected for pair i may come from any previous pairs, not just pair i−1 as in linear paths. Which hyperlink to cache at which node can be determined by analyzing a RON to determine the sequence of hyperlinks used to accomplish a task, also referred to as an oracle, in one embodiment.

Figure 7:
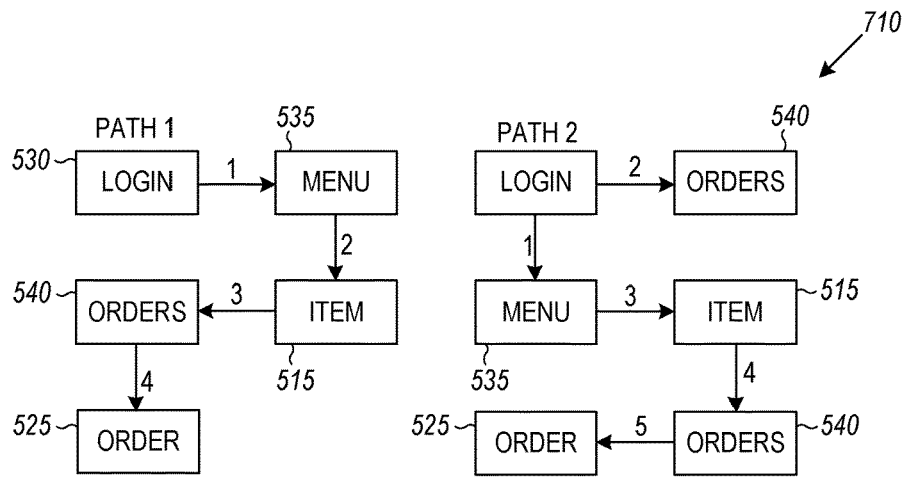
FIG. 7 illustrates path trees for example orders using the RON graph of FIG. 5 according to an example embodiment.

Paths 1 and 2 are represented as path trees 700 and 710 in FIG. 7. The nodes are represented with rectangles having labels consistent with the labels in FIG. 5. Each arrow is numbered to correspond with the order of nodes in the paths and mark the positions of pairs in the path. Path 2 at 710 is easily identified as nonlinear as there is no hyperlink from node menu 535 to node orders 540. The difference between the linear and nonlinear paths is made explicit by the different structures of their path trees. The path tree of linear Path 1 reduces to a list, while the path tree of nonlinear Path 2 has a branch at node login. The branch shows that the client backtracks to node orders via node login at pair 2, before returning to node item at pair 3.

Path 3: [(Post, login)$_0$, (Get, menu)$_1$, (Get, order)$_2$] is not hypertext-driven because the client attempts to backtrack at pair 2 to node order 525 not adjacent to its previous pairs.

Path 4: [(Post, login)$_0$, (Get, orders)$_1$, (Get, order)$_2$, (Get, monitor)$_3$] is not hypertext-driven either because the client jumps from node order 525 at pair 2 to node monitor 520 at pair 3, without going through the intermediate node monitors 550 first.

A Path Tree can distinguish hypertext-driven paths (e.g. paths 1 and 2) from non-hypertext-driven paths (e.g. paths 3 and 4), and linear paths (e.g. path 1) from nonlinear paths (e.g. path 2). A path tree represents the hyperlinks selected for a path as a tree from which the path can be reconstructed. A path tree associates each path pair (o, n)$_i$ with a RON node p, such that p has a hyperlink o to n. As each pair has exactly one p but p can be shared by many pairs, these associations form a tree.

Further detail regarding path trees, including definitions of nodes and edges is now provided. As indicated above, in a RON graph, N is a set of nodes, E is a set of edges, O is a set of operations, and s is an entry node. For a path, o is an operation and n is node. "i" is a path index of k paths. Given a RON graph where RON G=(N, E, O, s) and a path P=[(o, n)$_i$|0≤i≤k], let nodes(P, j)={n|(o, n)$_i$∈P and i≤j},
edges(P)={o|(o, n)$_i$∈P}, and
next(n)={(o, m)|(n,o,m)∈E}.

A path tree tree(G, P)=[(p, o, n)$_i$|0≤i≤k] exists, if the following conditions hold:
1. nodes(P, k)⊆N and edges(P)⊆E;
2. (o, s)$_0$∈P;
3. For each (o, n)$_i$∈P, there exists (p, o, n)$_i$∈tree(G,P) such that p∈nodes(P, i−1) and (o, n)∈next(p).

Decisions regarding the path tree may be made in accordance with the following decision rules:
1. Path P of G is hypertext-driven, if there exists a path tree tree(G, P); otherwise, it is not hypertext-driven.
2. Hypertext-driven path P of G is linear if all the nodes of tree(G, P) have at most one child; otherwise, P is nonlinear.

Condition 1 ensures that the operations and nodes of path P are in RON G. Condition 2 ensures that path P starts from the entry node of G. Condition 3 ensures that a client can only select hyperlinks from the previous pairs for each pair.

Figure 8:
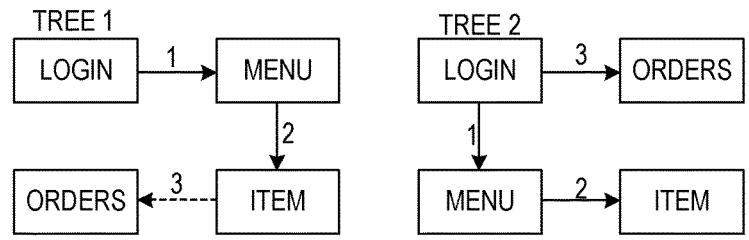
FIG. 8 illustrates path trees for further example orders using the RON graph of FIG. 5 according to an example embodiment.

A path is ambiguous, if and only if it has more than one path tree in a RON. For example, Path 5: [(Post, login)$_0$, (Get, menu)$_1$, (Get, item)$_2$, (Get, orders)$_3$] is ambiguous, if we allow the dashed edges in FIG. 5. The ambiguity arises because pair (Get, orders)$_3$ can be reached by one of the two different hyperlink selections: 1) follow the dashed edge (Tree 1); or 2) backtrack to node login (Tree 2), as shown in FIG. 8, which illustrates two path trees 800 and 810 for Path 5.

To correctly identify the hyperlinks selected for ambiguous paths, a client model (a simulation of what a client will do to access nodes, governed by the two policies) is used to assign each path a unique path tree, even if there is more than one. To resolve ambiguities between linear and nonlinear paths, the client model employs the Cache-First policy which prefers nonlinear paths over linear paths, i.e. cached hyperlinks over direct hyperlinks, to minimize excessive hyperlinks. The Cache-First policy assigns Tree 2 instead of Tree 1 to Path 5. By doing so, the policy correctly identifies the dashed edge as excessive because the edge does not occur in Tree 2.

Figure 9:
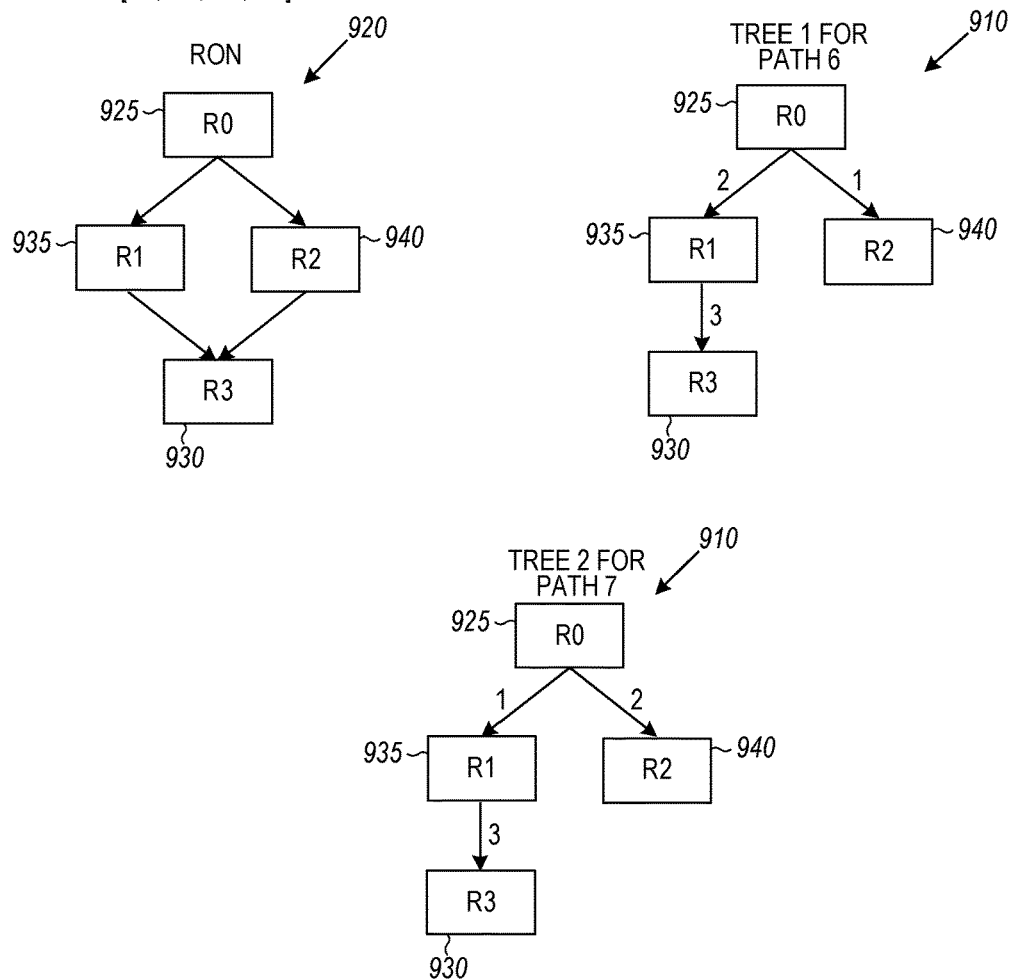
FIG. 9 illustrates path trees for further example orders using the RON graph of FIG. 5 according to an example embodiment.

However, Cache-First policy is not sufficient to resolve ambiguities that involve two nonlinear path trees for the same path. This situation is illustrated in FIG. 9, where both a Path 6: [R0, R2, R1, R3] and Path 7: [R0, R1, R2, R3] are ambiguous, because each has two different path trees: Tree 1 at 900 and Tree 2 at 910 (for clarity, the operations are omitted from the paths and RON 920).

The ambiguous paths are caused by the special symmetric topology of the RON 920 where node R0 at 925 has two nonlinear paths to node R3 at 930 via node R1 at 935 or node R2 at 940. To resolve such ambiguities, the client model employs the Recent-First policy, which always follows a hyperlink most recently used. This policy will assign Tree 1 to Path 6, because R1 is more recent than R2 in Path 6, but the policy will assign Tree 2 to Path 7, because R2 is more recent than R1 in Path 7.

Figure 10:
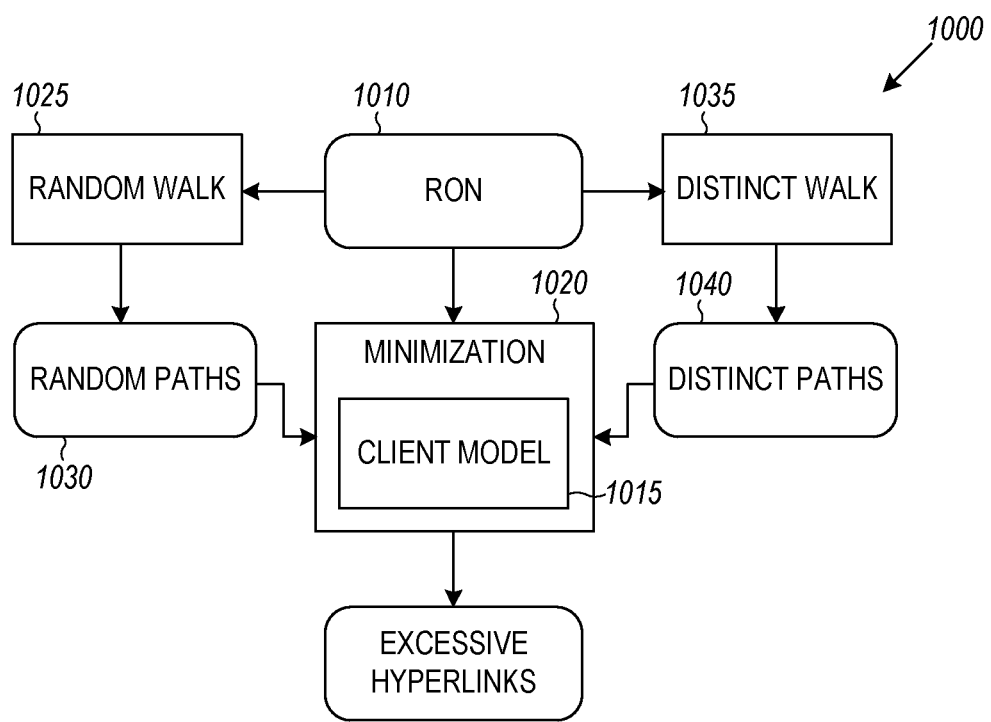
FIG. 10 is an example system of modules illustrating minimization procedures and workflow to identify excessive hyperlinks in a given RON according to an example embodiment.

FIG. 10 is an example system 1000 of modules illustration minimization procedures and workflow to identify excessive hyperlinks in a given RON 1010, which reduces dynamic and unbounded paths of a REST API to a fixed set. To deal with both types of ambiguities, the client model first applies the Cache-First policy and then the Recent-First policy when navigating a path. Based on a client model 1015, a connection minimization algorithm 1020 identifies excessive hyperlinks not used by any paths. The algorithm 1020 takes a collection of paths as input and produces excessive hyperlinks, if any, as the output. An efficient Random Walk algorithm 1025 is used to reduce the input paths 1030 for the connection minimization algorithm 1020. A Distinct Walk algorithm 1035 may optionally be used as a baseline to provide a set of distinct paths 1040 to verify the results. In some embodiments, no such verification is used, as results have shown a much faster convergence of identification of excessive paths by use of the Random Walk algorithm 1025 many complex RONs.

Figure 11:
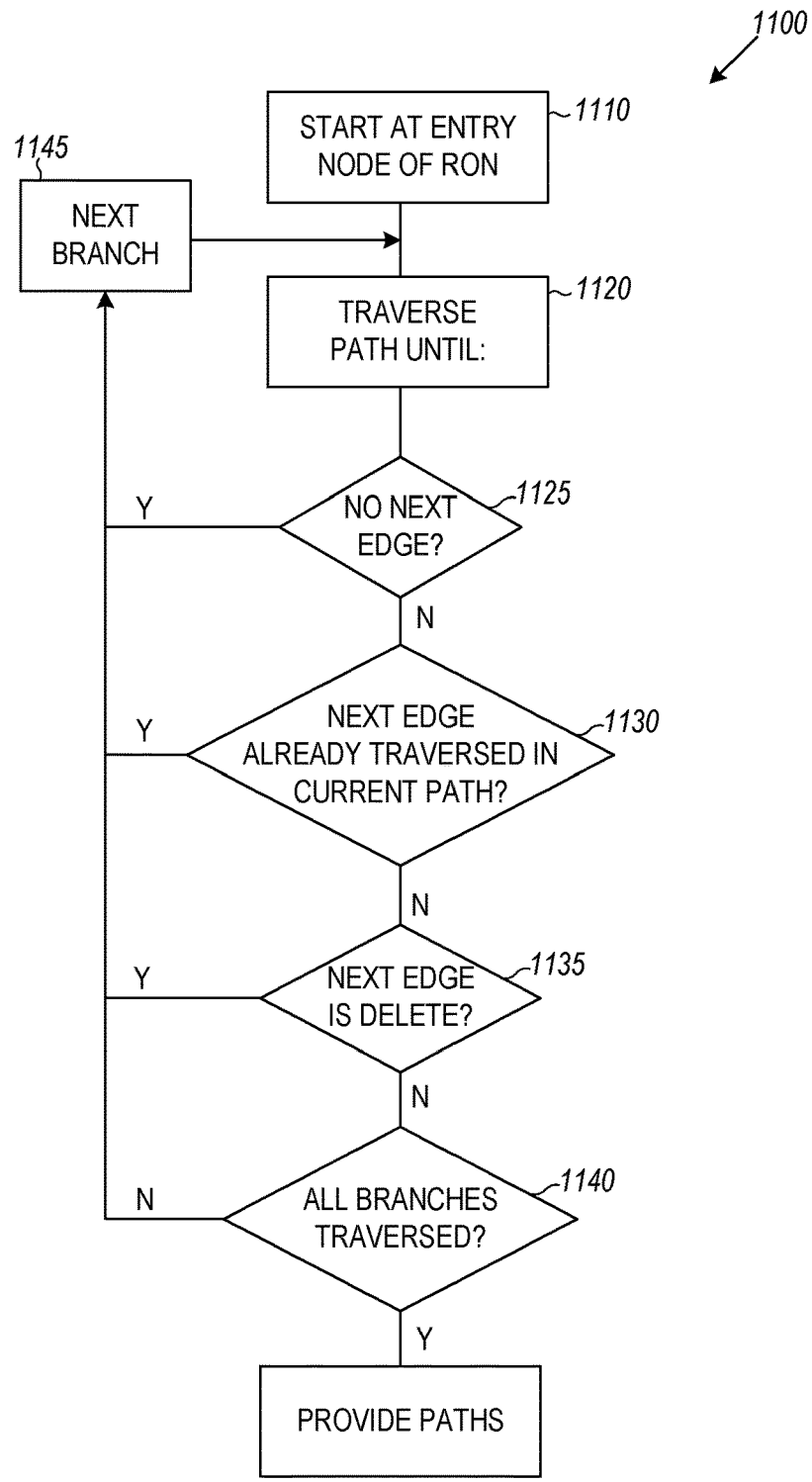
FIG. 11 is a flowchart illustrating a method of performing a distinct walk algorithm according to an example embodiment.

The Distinct Walk algorithm 1035 enumerates all the distinct hypertext-driven paths of the RON. FIG. 11 is a flowchart illustrating a method 1100 of performing the distinct walk algorithm. The algorithm starts 1110 at the entry node of the RON 1010 and traverses and documents a path at 1120 as far as possible until: 1) the node has no next edge 1125; 2) the next edge has been traversed in current path 1130; or 3) the next edge is Delete 1135. When a path ends, the algorithm checks if all branches have been traversed at 1140, and if not, backtracks 1145 to traverse different branches of nodes, until all branches have been traversed. If all branches have been traversed, the paths have been traversed and documented and are provided at 1150. The loops on a node are always traversed first so they are not treated as branches. Each edge of the RON is traversed by at least one distinct path, while two distinct paths may share some, but not all, edges.

The number of distinct paths traversing node n can be determined recursively in accordance with:

$$\text{path}(n) = |\text{in}(n)| \sum_{c \in \text{out}(n) - \text{loop}(n)} \text{path}(c) \quad (1)$$

where in(n) is the set of incoming edges to n, out(n) is the set of outgoing edges from n, and loop(n) is the set of loops on n. The total number of distinct paths of a RON can grow exponentially with the number of edges.

The distinct walk algorithm 1035 looks similar to but is different from Depth-First Traversal (DFT) of graphs. The main difference is that this algorithm maintains a local history of the traversed edges for each path, whereas DFT maintains a global history for all the paths such that each edged is traversed exactly once. Consequently, DFT may not traverse all the paths necessary to correctly identify excessive hyperlinks. For the RON 100 in FIG. 1 as an example, DFS will only traverse paths P1=[A,B,D], P2=[A,B,C,D] and P3=[A,C,B]. Based on these paths, the essential hyperlink C→D will be mistakenly identified as excessive, because P3 can use cached hyperlink B→D instead of C→D. The path [A,C,D] that uses C→D is not generated by DFS as edge C→D is already traversed in P2.

Figure 12:
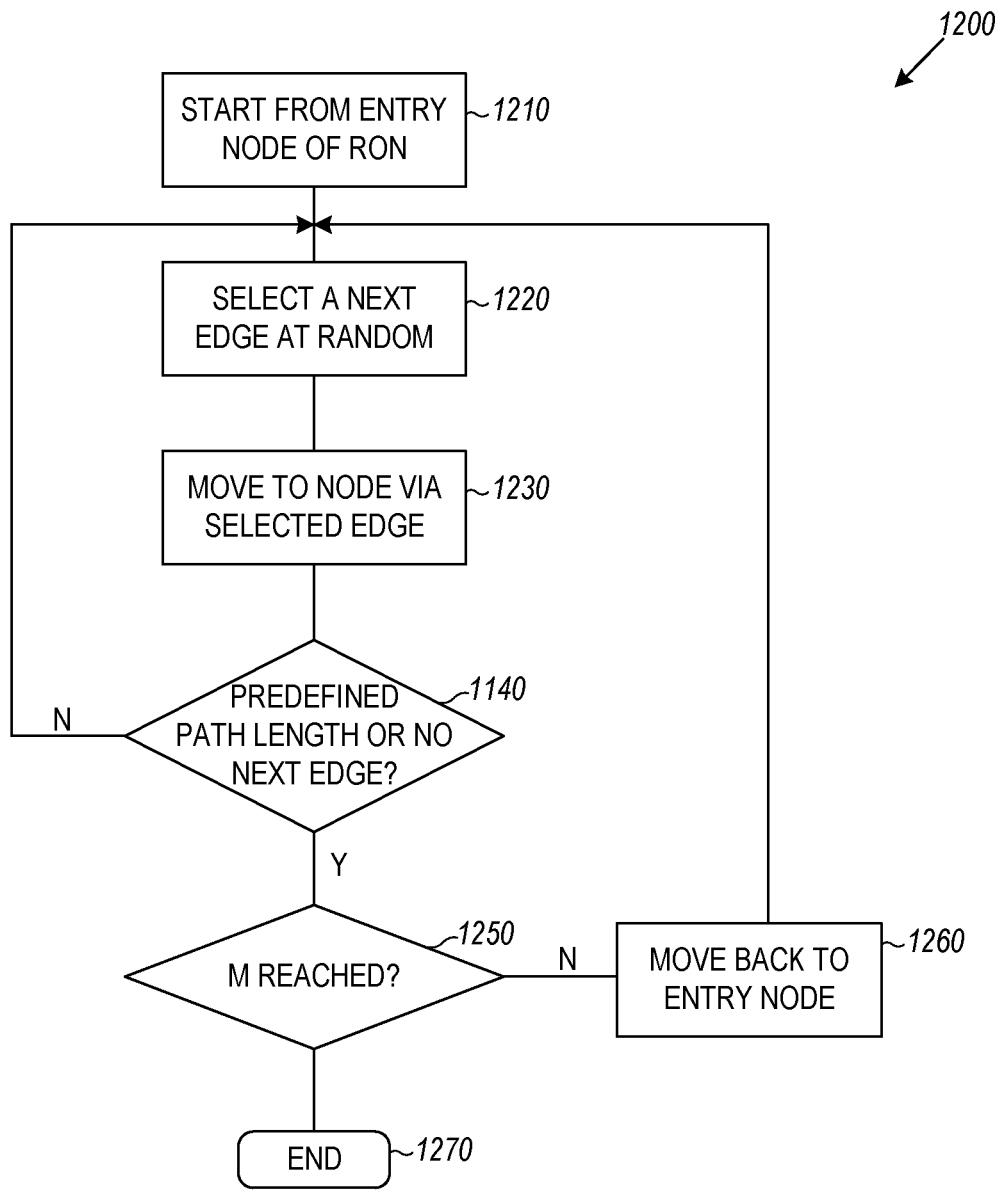
FIG. 12 is a flowchart illustrating a method of performing a random walk algorithm to traverse paths according to an example embodiment.

The random walk algorithm 1025 avoids testing all the distinct paths. FIG. 12 is a flowchart illustrating a method 1200 of performing a random walk algorithm to traverse paths starting at 1210 from the entry node of a RON and selects at 1220 a next edge at random with a uniform probability distribution. Method 1200 then moves to the selected node at 1230 and repeats the edge selection process, until a predefined path length is reached or the node has no next edge, whichever comes first as indicated at 1240. The time complexity of this algorithm is O(N) for a path of N pairs. To generate M paths from a RON, the random walk algorithm is repeated M times as indicated at 1250, moving back to the entry node as indicated at 1260 with different random seeds. Unlike distinct walk 1035 that generates distinct hypertext-driven paths with restrictions, random walk algorithm 1025, 1200 may generate duplicate paths, paths with unordered loops, and paths that continue beyond Delete edges. All of the paths that are generated by the random walk are provided to the connection minimization algorithm 1020 in one embodiment.

Figure 13:
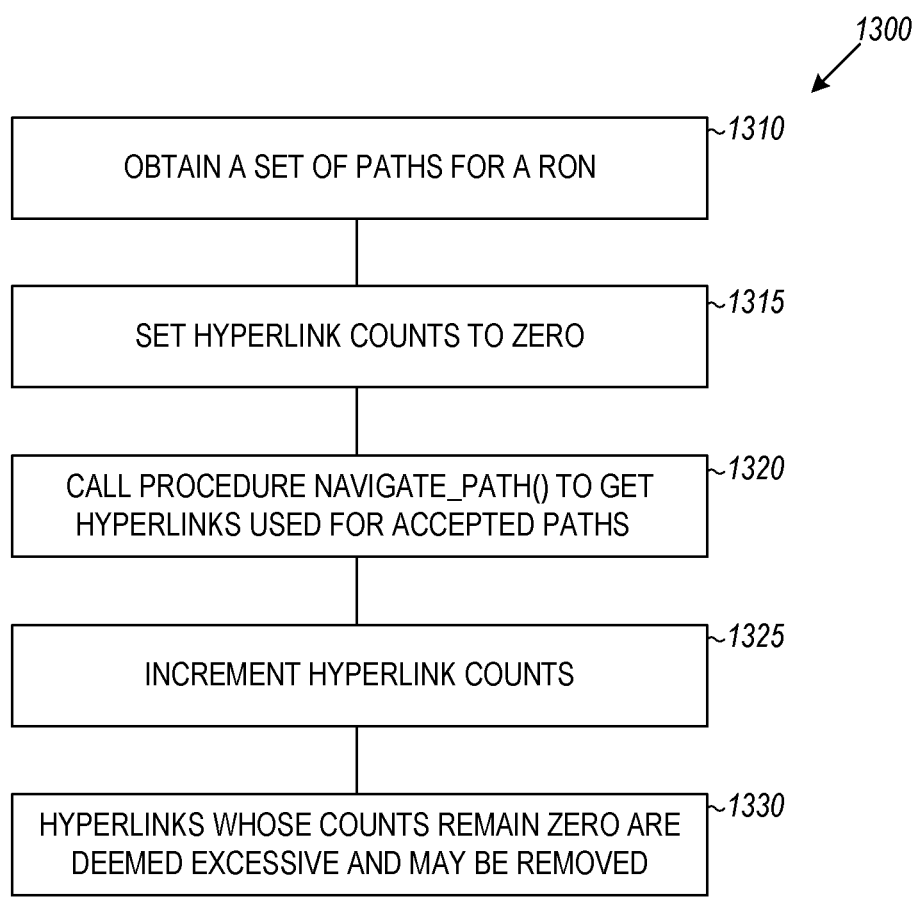
FIG. 13 is a flowchart illustrating a method of implementing the connection minimization algorithm according to an example embodiment.

FIG. 13 is a flowchart illustrating a method 1300 of implementing the connection minimization algorithm 1020. A code listing in Python is also provided following the description of method 1300. At 1310, a set of paths for a RON is obtained. Hyperlink counts are set to zero at 1315. A navigate_path( ) procedure is called at 1320 to get hyperlinks used for accepted paths. At 1325, the hyperlink counts are incremented. At 1330, hyperlinks whose counts remain zero are deemed excessive and may be removed from an essential set of hyperlinks.

Figure 14:
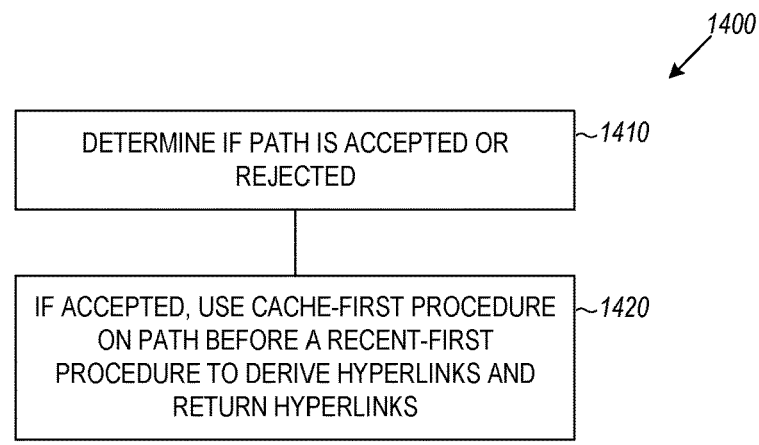
FIG. 14 is a flowchart illustrating a method of implementing the navigate path( ) procedure according to an example embodiment.

FIG. 14 is a flowchart illustrating a method 1400 of implementing the navigate_path( ) procedure referred to at 1320. The navigate_path( ) procedure implements the client model referred to above. At 1410, method 1400 determines if a path is accepted or rejected. If accepted, a cache-first procedure is applied to the path before a recent-first procedure to derive hyperlinks at 1420 used for accepted paths. The code listing below also includes code for the navigate_path( ) procedure.

The following is a code listing of the minimize_connections( ) procedure and the navigate_path( ) procedure which may be used to implement the connection minimization algorithm:

```
1. def minimize_connections(self, paths):
2.   for path in paths:
3.     (result, selected_links)=self.navigate_path(path)
4.     if result:
5.       for link in selected_links:
6.         link[2]+=1
7. def navigate_path(self, path):
8.   curr_node=self.source
9.   selected_links=[ ]
10.  for i in range(len(path)):
11.    pair=path[i]
12.    (succ, link, next)=self.move_backward(path, i, pair)
13.    if succ:
14.      selected_links.append(link)
15.      curr_node=next
16.      continue
17.    (succ, link, next)=self.move_forward(curr_node, pair)
18.    if succ:
19.      selected_links.append(link)
20.      current node=next
21.      continue
22.    return (False, selected_links)
23.  return (True, selected_links)
```

Line 1 defines the give sets of paths that the algorithm operates on. Line 2 sets up a loop for a path. Line 3 calls the navigate path procedure to obtain a set of hyperlinks used for the path. A link count for each link returned is incremented at line 6.

The navigate path procedures begins at line 7 on an identified path and basically simulates a client to determine the links the client will use in navigating the path in lines 8-21. Lines 8-8 set variables to track where in the path the procedure is and to keep track of links. Line 10 sets up a loop to navigate the path.

The minimize_connections( ) procedure calls the navigate_path( ) procedure, which implements the client model to determine the hyperlinks for each path and counts how many times each hyperlink is selected. Hyperlinks with 0 counts after all the paths are navigated are labeled excessive.

Procedure navigate_path( ) attempts to assign a path tree to the given path according to Definition 2 with two policies: Cache-First and Recent-First. The procedure initializes curr_ node to the entry node of the RON, and attempts to derive the hyperlink for next pair of the path. At first, the move_ backward( ) procedure is called at line 12 to enforce the Cache-First policy. The procedure searches the previously visited nodes in RON for a hyperlink link and node next, such that link connects to next and next matches the node in pair. On success at line 13, curr_node is set to next at line 15. If move_backward( ) fails, the move_forward( ) procedure is called at line 17 to test if curr_node has a hyperlink link that connects to node next and next matches the node in pair. On success at line 18, curr_node is set to next at line 20. In both tests, curr_node is set to the most recently visited node in RON to enforce the Recent-First policy. If both moves for the pair fail, the path is rejected. If all the pairs of a path are matched, then the path is accepted. In both cases, the accumulated selected_links are returned.

The time complexity of the navigate_path( ) procedure is $O(N^2)$ for a path of N pairs, because for each pair at position $1 \le i \le N$, the move_backward( ) procedure searches i−1 previous pairs, while the move_forward( ) procedure takes $O(1)$ time. The time complexity of the minimize_connections( ) procedure is $O(MN^2)$ for M paths of average length N, as the procedure calls the navigate_path( ) procedure for each path.

False positive excessive hyperlinks are avoided if all the distinct hypertext-driven paths are navigated by the client model. Here is an informal proof. Suppose a hyperlink is essential, then it must be used by at least one path. Since the client model navigates all the paths, it will navigate the path that uses the hyperlink and increments its count. As the result, the essential hyperlink will not be labeled excessive. False negative excessive hyperlinks are avoided without navigating all the distinct paths. Suppose a hyperlink is excessive, then no path will ever use it, including the paths generated by the random walk algorithm. As the result, the count of the hyperlink will remain 0 and will not be labeled essential.

The method described to identify excessive hyperlinks in a RON graph by combining a random walk algorithm with a connection minimization algorithm. The excessive hyperlinks may be removed from the corresponding REST API. The use of the RON model reduces the unbounded and dynamic paths of a REST API to a fixed set, allowing use of the connection minimization algorithm. A path tree mechanism maybe used to distinguish different types of observable paths. A polynomial time random walk algorithm to reduce the large number of paths in a RON to a small set. The client model with two policies, correctly derives hyperlinks used for ambiguous paths. A polynomial time connection minimization algorithm based on the client model is used to identify excessive hyperlinks. Some advantages which may be exhibited by various embodiments include minimizing the connections of a REST API at design time without involving the actual clients. False negative decisions are avoided even with incomplete paths, and it avoids false positive decisions with complete paths. The method is very efficient as it runs in polynomial time and converges to correct result relatively fast. The method can accept different types of paths, including duplicate paths and paths with duplicate pairs. The method can be easily integrated to many REST toolkits because RON is a lowest common denominator of many REST modeling languages.

Figure 15:
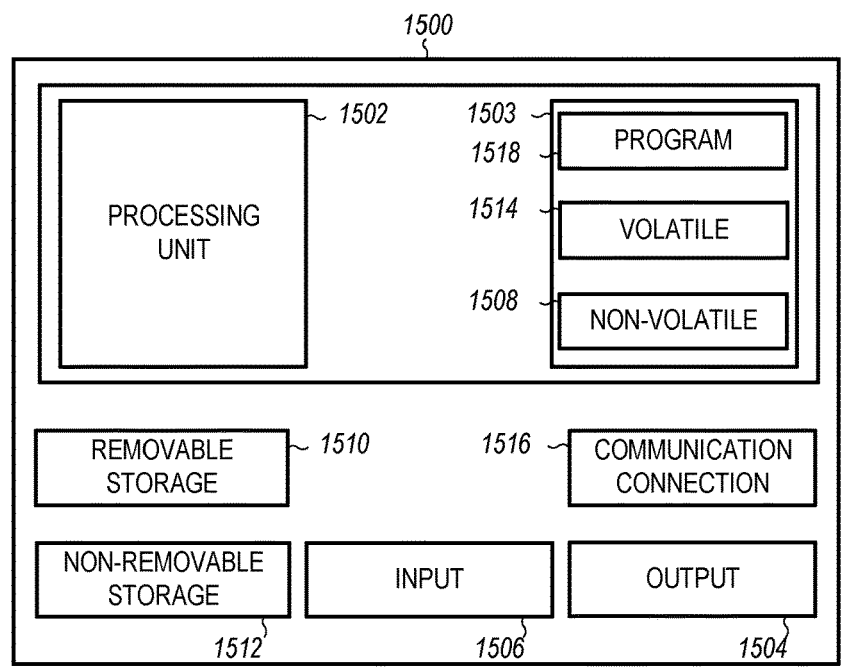
FIG. 15 is a block diagram illustrating circuitry for storing distributed network representations, methods, and algorithms for identifying excessive connections according to example embodiments.

FIG. 15 is a block diagram illustrating circuitry for storing resources, implementing resources, navigating connections, storing procedures and models, and for implementing algorithms and performing methods according to example embodiments. All components need not be used in various embodiments. For example, the clients, servers, and network resources may each use a different set of components, or in the case of servers for example, larger storage devices.

One example computing device in the form of a computer 1500 may include a processing unit 1502, memory 1503, removable storage 1510, and non-removable storage 1512. Although the example computing device is illustrated and described as computer 1500, the computing device may be in different forms in different embodiments. For example, the computing device may instead be a smartphone, a tablet, smartwatch, or other computing device including the same or similar elements as illustrated and described with regard to FIG. 15. Devices, such as smartphones, tablets, and smartwatches, are generally collectively referred to as mobile devices or user equipment. Further, although the various data storage elements are illustrated as part of the computer 1500, the storage may also or alternatively include cloud-based storage accessible via a network, such as the Internet or server based storage.

Memory 1503 may include volatile memory 1514 and non-volatile memory 1508. Computer 1500 may include— or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1500 may include or have access to a computing environment that includes input 1506, output 1504, and a communication connection 1516. Output 1504 may include a display device, such as a touchscreen, that also may serve as an input device. The input 1506 may include one or more of a touchscreen, touchpad, mouse, keyboard, camera, one or more device-specific buttons, one or more sensors integrated within or coupled via wired or wireless data connections to the computer 1500, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1502 of the computer 1500. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 1520.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method of minimizing edges in a directed graph representing a distributed system, the method comprising:
    using a representational state transfer application program interface (REST API) including a plurality of resource nodes of the directed graph representing resources identified by uniform resource indicators (URIs) and a plurality of edges of the directed graph representing a plurality of hyperlinks between the resources, traversing paths in the directed graph including:
performing a distinct walk procedure to determine all distinct paths in the directed graph; and
performing a random walk procedure including:
starting from an entry node of the directed graph, selecting an edge at random;
moving to a node coupled by the selected edge and repeating random selection of an edge until a predefined path length is reached or no edge exists from the node coupled by the selected edge;
storing each selected edge; and
repeating selecting an edge at random from the entry node, moving, and repeating selection of an edge until a selected number of paths is obtained;
simulating a client accessing the resources, the simulated client selecting, at each node, one of the stored edges instead of an edge that was not encountered in the random walk procedure; and
identifying as excessive edges, edges that are not used by any of the selected number of paths, wherein the excessive edges are removable from the distributed system without preventing client access to resources in the distributed system.

2. The method of claim 1 wherein:
simulating the client accessing the resources comprises caching the edges of the paths encountered in the random walk procedure; and
identifying the excessive edges comprises applying a cache-first policy to take client cached edges into account followed by application of a recent-first policy to select a more recently cached edge over a less recently cached edge.

3. The method of claim 2 wherein the cache-first policy selects the cached edges over direct edges.

4. The method of claim 2 wherein the cache-first policy and recent-first policy resolve ambiguous edges.

5. The method of claim 1 wherein a different random seed is used at the entry node for each path.

6. The method of claim 1 wherein the hyperlinks include operations comprising get, put, post, and delete.

7. The method of claim 1 wherein the directed graph comprises a resource oriented network (RON) representation of the distributed system comprising the REST API.

8. A device comprising:
a non-transitory memory storage comprising instructions; and
one or more processors in communication with the memory, wherein the one or more processors execute instructions to perform operations including:
using a representational state transfer application program interface (REST API) including a plurality of resource nodes of a directed graph representing resources identified by uniform resource indicators (URIs) and a plurality of edges of the directed graph representing a plurality of hyperlinks between the resources, traversing paths in a directed graph including:
performing a distinct walk procedure to determine all distinct paths in the directed graph; and
performing a random walk procedure including:
starting from an entry node of the directed graph, selecting an edge at random;
moving to a node coupled by the selected edge and repeating random selection of an edge until a predefined path length is reached or no edge exists from the node coupled by the selected edge;
storing each selected edge; and
repeating selecting an edge at random from the entry node, moving, and repeating selection of an edge until a selected number of paths is obtained;
simulating a client accessing the resources, the simulated client selecting, at each node, one of the stored edges instead of an edge that was not encountered in the random walk procedure; and
identifying as excessive edges, edges that are not used by any of the selected number of paths, wherein the excessive edges are removable from a distributed system without preventing client access to resources in the distributed system.

9. The device of claim 8 wherein:
simulating the client accessing the resources comprises caching the edges of the paths encountered in the random walk procedure; and
identifying excessive edges comprises applying a cache-first policy to take client cached edges into account followed by application of a recent-first policy, wherein the cache-first policy selects cached edges over direct edges and wherein the recent-first policy selects a more recently cached edge over a less recently cached edge to resolve ambiguous edges.

10. The device of claim 8 wherein a different random seed is used at the entry node for each path.

11. The device of claim 8 wherein the hyperlinks include operations comprising get, put, post, and delete and wherein the directed graph comprises a resource oriented network (RON) representation of the distributed system comprising the REST API.

12. A system comprising:
a non-transitory storage device comprising instructions; and
one or more processors in communication with the non-transitory storage device, wherein the one or more processors are configured by the instructions to process a resource oriented network (RON) directed graph representation of a distributed system, the instructions comprising:
a REST API (Representational State Transfer Application Program Interface) stored on the non-transitory storage device the REST API including a plurality of resource nodes of the directed graph representing resources identified by uniform resource indicators (URIs) and a plurality of edges of the directed graph representing a plurality of hyperlinks between the resources;
a distinct walk procedure, stored on the non-transitory storage device that conditions the one or more processors to determine all distinct paths in the RON;
a random walk procedure stored on the storage device that conditions the one or more processors to perform a procedure comprising:
starting from an entry node of the directed graph, selecting an edge at random;
moving to a node coupled by the selected edge and repeating random selection of an edge until a predefined path length is reached or no edge exists from the node coupled by the selected edge;
storing each selected edge; and
repeating selecting an edge at random from the entry node, moving, and repeating selection of an edge until a selected number of paths is obtained;
a client model stored on the non-transitory storage device, the client model including a cache-first policy that configures the one or more processors to select a stored edge instead of an edge that was not encountered in the random walk procedure and a recent-first policy that configures the one or more processors to select a more recently stored edge over a less recently stored edge to resolve ambiguous hypertext driven paths; and a minimization procedure stored on the non-transitory storage device to condition the one or more processors to identify excessive hyperlinks from the selected number of paths, such excessive hyperlinks corresponding to edges in the RON that are not used by any of the selected number of paths.

* * * * *